United States Patent

[11] 3,573,774

| [72] | Inventor | Everett O. Olsen<br>Wrentham, Mass. |
|---|---|---|
| [21] | Appl. No. | 636,882 |
| [22] | Filed | May 8, 1967 |
| [45] | Patented | Apr. 6, 1971 |
| [73] | Assignee | The Foxboro Company<br>Foxboro, Mass. |

[54] TWO-WIRE TRANSMISSION SYSTEM FOR REMOTE INDICATION
4 Claims, 2 Drawing Figs.

[52] U.S. Cl............................................... 340/199,
307/237, 340/210, 323/6, 323/9
[51] Int. Cl........................................................ G08c 19/08
[50] Field of Search............................................. 340/199,
210, 196; 307/237, 202; 323/6, 9

[56] References Cited
UNITED STATES PATENTS

| 2,876,642 | 3/1959 | Scorgie | 307/237 |
|---|---|---|---|
| 3,069,569 | 12/1962 | Singer | 307/237 |
| 3,350,578 | 10/1967 | Carter | 307/237 |
| 2,936,614 | 5/1960 | Godbey | 340/199 |
| 3,051,933 | 8/1962 | Cressey | 340/210 |
| 3,079,545 | 2/1963 | Kretsch | 340/199 |
| 3,354,399 | 11/1967 | Houpt | 340/210 |

*Primary Examiner*—Thomas B. Habecker
*Attorney*—David E. Hoppe

ABSTRACT: For the purpose of sensing the condition of remote apparatus, AC energizing power is sent from a local position along a two-wire transmission line to a remote transformer whose coupling between input and output is affected by the condition of the remote apparatus; the transformer output is converted to DC having a level indicating the condition of the remote apparatus, and this DC signal is sent back along the same two-wire transmission line to the local position; bipolar clipping of the AC energizing power at the input of the transformer makes the entire system relatively insensitive to system variables affecting the AC energizing power.

PATENTED APR 6 1971  3,573,774
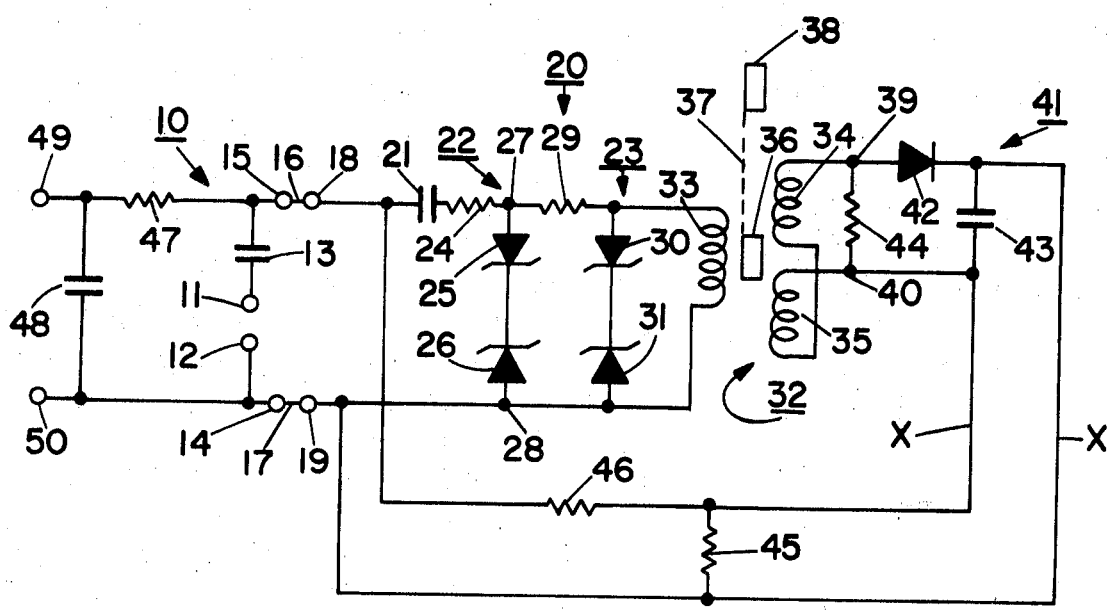
FIG. I
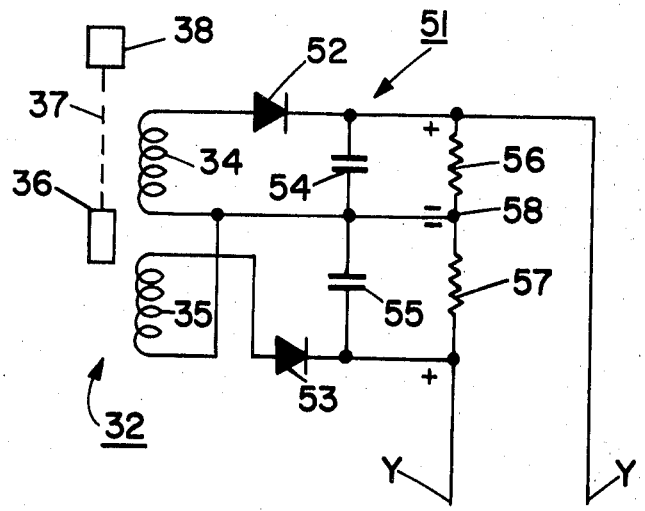
FIG. II
INVENTOR.
EVERETT O. OLSEN
BY David E. Hopper
ATTORNEY

TWO-WIRE TRANSMISSION SYSTEM FOR REMOTE INDICATION

It is usually desirable to sense the position or condition of remote apparatus in the field in the simplest manner available, and with a maximum of accuracy. Where a single transmission system is to be employed with a single remote device, and the distance between the local position and the remote device is great, such as in the range normally associated with telemetering, a two-wire transmission system, where one of the wires may be a ground return, offers advantages in simplicity. Very often, the field apparatus is limited in its access to power sources. Therefore, it frequently is a requirement that the remote sensing portion of the transmission system not require the provision of a power source at the remote location. Two-wire remote condition-sensing systems have been developed in which energizing power in a first form is transmitted from a local source down the transmission line to the remote location in the field; this first form of power is operated upon by the remote portion of the system and translated into an alternate form of power which can easily be prevented from merging indistinguishably with the original first form of power. A selected characteristic, such as amplitude, of the condition-responsive power may represent the magnitude of the remote condition. The translated condition-representative signal is reapplied to the transmission line and sent back to the local source for reading by appropriate means discriminating between the first form of power and the translated power.

In any such transmission system, problems of accuracy and stability must be considered. It is desired to sense the translated signal which is representative of the remote condition with an accuracy suitable suitable for the overall application in which the remote condition is a part, typically 1 percent or 0.5 percent. Owing to very long lengths of the transmission line, and the distance of the remote device from the local source, it is often necessary to consider the affect the transmission line on the provision of energizing power to the remote location as well as the affect of the line upon the return of the translated condition-represented signal to the local source. It is most convenient and inexpensive in using long transmission lines, to employ a single twisted pair of common type wire. Such transmission runs must be expected to exhibit changing characteristics as a consequence of variations in their environment.

Accordingly, this invention directs itself to the problem of providing a two-wire remote-sensing system which is required to be relatively insensitive to fluctuations of various conditions throughout its length, such as temperature or impedance. The invention provides a two-wire remote-sensing transmission system which is energized by AC power at the local source, with the energizing AC power being transmitted to the remote location and there translated into a DC signal having a level representative of the remote apparatus condition. This condition-representative DC signal is is sent back along the same two-wire transmission line to the local source for a reading of the remote condition. In order to provide a high degree of insensitivity to changes in the energizing AC power as it is provided to the remote location, the invention employs means to stabilize the amplitude of the AC energizing power coupled to the primary of the remote transformer. As a consequence, the signal appearing at the secondary of the remote transformer is dependent only upon changes in the transformer coupling effected by the remote apparatus. Conversion of the remote transformer secondary signal to DC then yields a DC level proportional to the condition of the remote apparatus. Specifically, Zener diodes in a back-to-back series configuration are employed across the transformer primary to stabilize the amplitude of the energizing power appearing across the transformer primary. Another feature is the provision of a differential secondary for the remote condition-sensing transformer; this provision enables the reference of the zero level of the DC signal to a null position of the remote apparatus. With reference to the null position of the remote apparatus, circuit connections are described for providing a DC signal which is either sensitive to the direction of the displacement of the remote apparatus or insensitive to such direction.

Other objects and advantages of this invention will be in part apparent from the specification herewith, and in part from the FIGS. in which:

FIG. 1 is a schematic diagram of an embodiment of the remote-sensing transmission system;

FIG. 2 is a revised schematic diagram of the transformer secondary circuit shown in FIG. 1, which has been adapted for phase sensitive signal translation.

Referring to FIG. 1, local source 10 of the transmission system has supplied thereto AC power which is connected to terminals 11 and 12. Illustratively, the frequency of the AC power may be 5,000 cycles per second. Capacitor 13 is in series between terminal 11 and the remainder of the system to block the DC condition-representative signal from the source of the AC energizing power supplied to terminals 11 and 12. Terminal 12 is directly connected to local source terminal 14, and terminal 11 is connected through capacitor 13 to terminal 15 of the local source. Terminals 14 and 15 are the connections of local source 10 to the two-wire transmission run 16 and 17 between local source 10 and remote position 20. Lines 16 and 17 represent a simple two-wire transmission run, which may be of any length, and made up of any kind of conductors which may be characterized over their length by indeterminant variable impedances and capacities.

The AC energizing power arriving at terminals 18 and 19 of remote location 20 may be expected to exhibit variable characteristics owing to the distance of remote location 20 from local source 10, which is the source of the AC energizing power. The transmission run length represented by wires 16 and 17 may be influenced by a variety of field conditions over the distance separating local source 10 and remote location 20. Temperature, humidity, moisture, chemical activity, and the like may so affect transmission run 16—17, that the AC energizing power arriving at terminals 18 and 19 of remote location 20 is attenuated to varying degrees. In addition, the AC energizing power provided to terminals 11 and 12 at local source 10 may also vary as a result of of some condition associated with the local source 10. Accordingly, the AC energizing power arriving at terminals 18 and 19 of remote location 20 can be expected to vary widely, perhaps by as much as 20 percent. The AC energizing power arriving at terminals 18 and 19 is coupled through capacitor 21 to Zener clipping matrix 22, consisting of resistor 24 in series with back-to-back serially-connected Zener diodes 25 and 26, their cathodes being connected together. Capacitor 21 blocks the DC condition-representative signal on transmission line 16—17 from the input circuit of remote transformer 32. Zener diode clipping matrix 22 provides bipolar clipping of the AC energizing power, in that the breakdown potential of each Zener diode 25 and 26 determines the maximum amplitude of the respective half-cycle of AC energizing power that may appear across a respective Zener diode. Together, the back-to-back diodes 25 and 26 limit both half-cycles of AC power to a peak-to-peak amplitude appearing across the series configuration of diodes 25 and 26, which resultant signal resembles a square wave. The clipped-off portion of the AC energizing power in excess of this peak-to-peak amplitude is dropped across series resistor 24.

The square type of wave appearing across the series configuration of Zener diodes 25 and 26 is passed on to a second diode matrix 23 consisting of resistor 29 in series with back-to-back serially connected Zener diodes 30 and 31, connected with their cathodes together. This second diode matrix 23 is thereby connected with the first diode matrix 22 so that the anodes of Zener diodes 26 and 31 are connected together and the anodes of Zener diodes 25 and 30 are coupled by resistance 29. Primary 33 is connected to the anode of Zener diode 30 and to the anode of Zener diode 31. The second diode matrix 23 provides additional clipping of the square wave furnished by the first Zener diode matrix 22. Thereby, the regulation of the square wave passed on to the primary 33 of differential transformer 32 is further improved. Addition diode matrices may be added in the manner described to achieve as accurate a regulation of the square wave supplied to primary 33 as may be required. Zener diode matrix 23 clips a fairly well-regulated square wave transferred thereto by Zener diode matrix 22, and the resultant square wave appearing at primary 33 of transformer 32 will be well regulated. The AC energizing power appearing at terminals 18 and 19 of remote location 20 may change considerably, with the square wave applied to primary 33 remaining quite stable.

The coupling between primary 33 of differential transformer 32 and secondaries 34 and 35, thereof is controlled by movable slug 36. Slug 36 is mechanically positioned by means of linkage 37 which transfers the position of a remote apparatus 38, illustrated in block as item 38. Remote apparatus 38 may be any apparatus having a movable part such as a valve. If remote apparatus 38 were a valve, mechanical linkage 37 would transfer the valve position into a proportional movement of slug 36. It may be noted that by use of a variable coupling for differential transformer 32, slide wires are avoided, and no electrical sparking may occur, such as would be dangerous in certain field environments. In addition, linkage 37 may employ flexures, which practically eliminates wear due to friction.

Slug 36 of differential transformer 32 has a null position, at which slug 36 is centered and the signals appearing at differential secondaries 34 and 35 are equal. When secondaries 34 and 35 are wired serially so they may cancel, equal signals thereon will produce a resultant total output which is nulled. In FIG. 1, secondaries 34 and 35 are connected in a series cancellation arrangement, and the summed output of secondary windings 34 and 35 is taken between points 39 and 40; this summed output is the difference signal between the signals supplied by secondary windings 34 and 35. When slug 36 is displaced from its null position in either direction, the coupling between primary 33 and secondaries 34 and 35 is differentially affected so that one secondary receives an increase of signal transfer as a result of increased coupling, while the other secondary receives a decrease in signal transfer as a result of decreased coupling.

The output of differential transformer 32, appearing between points 39 and 40, is converted by rectification section 41 into a DC signal having a level representative of the displacement of slug 36 from its null position. Diode 42 has its anode connected to point 39 and has its cathode connected to one end of capacitor 43, the other end of capacitor 43 being connected to point 40. Thereby, the output of differential transformer 32 is converted into a DC level. Resistor 45 across capacitor 43 serves to reduce the time constant of the rectification circuit 41 sufficiently to allow adequate response to changes in the position of slug 36. The DC level stored in capacitor 43 is connected through series resistor 46 to terminals 18 and 19 of remote location 20. By this connection the DC level is connected across two-wire transmission line 16—17 and transferred back to terminals 14 and 15 of local source 10. Resistor 46 in combination with capacitor 43 provides filtering of the AC energizing power appearing at terminals 18 and 19, so that the AC energizing power does not appreciably affect the output circuit of differential transformer 32. A chock may be used in place of resistor 46 for increased series loading, with a consequent decrease in series resistance between rectification network 41 and transmission line 16—17. If the DC level is to be read by a relatively low impedance device at local source 10, the use of a chock in place of resistor 46 is preferred, so that the reading error may be thereby reduced.

The DC signal whose level is representative of the condition of remote apparatus 38, is transferred back to terminals 14 and 15 of local source 10, and therefrom through serial resistor 47 to reading terminals 49 and 50 of local source 10. Resistor 47 and capacitor 48 which is connected across terminals 49 and 50, filters the AC power so that it does not appreciably affect reading terminals 49 and 50. Again a choke may be used in placed of resistance 47 for increased loading with a consequent decrease in series resistance, which may be desirable with a relatively low impedance reading device connected across terminals 49 and 50. As noted previously, capacitor 13 blocks the DC condition-representative signal from terminals 11 and 12 of the AC energizing power source.

The rectification network circuit 41 shown in FIG. 1 provides a DC level therefrom which is phase-insensitive. The level of the DC signal corresponds to the absolute displacement of slug 36 from its null position, irrespective of which direction it may have moved therefrom. Where it is desired to have a phase-sensitive output of DC signal, the circuit of FIG. 2 may be used in place of the differential transformer 32 output circuit shown in FIG. 1. Differential transformer 32 secondary windings 34 and 35 are shown connected in an alternate configuration including rectification network 51 which has an output Y-Y. This circuit of FIG. 2 may be substituted in the circuit of FIG. 1 by breaking the output of rectification network 41 at points X-X and connecting Y-Y thereto in its place.

Secondary winding 34 has one lead connected in common with a lead of secondary winding 35, both such leads connected together and to point 58. The other lead of secondary winding 34 is connected to the anode of diode 52, and the other lead of a secondary winding 35 is connected to the anode of the diode 53. Capacitor 54 is connected between the cathode of diode 52 and point 58 and capacitor 55 is connected between the cathode of diode 53 and point 58. A loading resistance 56 is in parallel with capacitor 54 and a loading resistance 57 is in parallel with capacitor 55. The output of rectification network 51 is taken between the cathodes of diodes diodes 52 and 53, and connected to Y-Y. By this alternate circuit configuration, the DC level is phase-sensitive, changing polarity as slug 36 is moved through its null position.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

I claim:

1. A remote indicating system comprising:
   a dual conductor transmission means for connecting a remote position to a local position;
   a source of AC energizing power at said local position coupled through said dual conductor transmission system to said remote position;
   clipping means at said remote position coupled to said dual conductor transmission system for clipping said AC energizing power applied supplied to said remote position to a substantially square wave form having a regulated amplitude, said clipping means including a pair of back-to-back serially connected zener diodes shunting said conductors, differential transformer means having its coupling varied by a movable slug coupled to a desired variable and being energized by said clipped energizing power to yield an output determined by said slug position;
   means for converting said square wave form of said transformer output into a DC level varying with the desired of a device to be monitored at said remote position; and
   impedance means for coupling said DC level from said means for converting to said dual conductor transmission system so that said DC level is coupled back therethrough to said local position over the same dual conductors employed for furnishing AC energizing power to said remote position whereby effects caused by fluctuations in the level of said AC energizing power supplied to said remote position are minimized.

2. The improvement in the remote indicating system of claim 1, wherein impedance means is connected in series with said conductors.

3. The improvement in the remote indicating system of claim 2 with a second pair of zener diodes serially-connected back-to-back across said conductor between said series impedance means and said source of said AC energizing power and with a second series impedance means being connected between said aforementioned series impedance means and said source of said AC energizing power, whereby the regulation of said AC energizing power is further improved as appearing at said primary.

4. The improvement in the remote indicating system of claim 2 with the means for converting being connected in a phase-sensitive configuration, whereby said DC level has a polarity corresponding to the direction of displacement of said movable portion from its null-centered position.